United States Patent [19]

Briese

[11] Patent Number: 5,133,150
[45] Date of Patent: Jul. 28, 1992

[54] INSECT TRAP FOR GYPSY MOTHS AND OTHER FLYING INSECTS

[76] Inventor: Michael W. Briese, P.O. Box 8242, Silver Spring, Md. 20907

[21] Appl. No.: 655,592

[22] Filed: Feb. 15, 1991

[51] Int. Cl.⁵ ............................................. A01M 1/10
[52] U.S. Cl. ...................................................... 43/122
[58] Field of Search ................ 43/107, 122, 119, 118, 43/121, 131, 113

[56] References Cited

U.S. PATENT DOCUMENTS

| | | |
|---|---|---|
| D. 208,303 | 8/1967 | Musikantow et al. . |
| D. 229,405 | 11/1973 | Kuchenbecker et al. . |
| D. 240,728 | 7/1976 | Lutes . |
| D. 270,175 | 8/1983 | Stout . |
| 1,258,962 | 3/1918 | Taylor . |
| 1,419,859 | 6/1922 | Keckler . |
| 1,715,173 | 5/1929 | Opitz . |
| 1,812,512 | 6/1931 | Carballo . |
| 1,862,325 | 6/1932 | Watson ................................. 43/107 |
| 2,518,819 | 8/1950 | Roessler, Jr. . |
| 3,343,744 | 9/1967 | Morell et al. . |
| 3,352,053 | 11/1967 | Anderson . |
| 3,359,081 | 12/1970 | Nelson . |
| 3,581,429 | 6/1971 | Hickman . |
| 3,768,720 | 10/1973 | Bundy . |
| 3,820,273 | 6/1974 | Novak . |
| 3,855,727 | 12/1974 | Canoy . |
| 3,959,914 | 6/1976 | Kaveloski . |
| 4,044,494 | 8/1977 | Grajnert ............................... 43/119 |
| 4,133,137 | 1/1979 | van Adelsberg . |
| 4,217,723 | 8/1980 | Hrebec . |
| 4,244,135 | 1/1981 | Harwoods . |
| 4,260,101 | 4/1981 | Webinger . |
| 4,337,592 | 7/1982 | Hasegawa . |
| 4,400,903 | 8/1983 | Seidenberger . |
| 4,442,624 | 4/1984 | Browne . |
| 4,452,006 | 6/1984 | Steck et al. . |
| 4,505,065 | 3/1985 | Niemeyer . |
| 4,551,941 | 11/1985 | Schneidmiller . |
| 4,571,880 | 2/1986 | Hayward .............................. 43/122 |
| 4,581,845 | 4/1986 | Burkholder et al. . |
| 4,592,163 | 6/1986 | Wilson . |
| 4,642,936 | 2/1987 | Tobin ................................... 43/122 |
| 4,706,410 | 11/1987 | Briese . |
| 4,813,174 | 3/1989 | Cook . |
| 4,823,506 | 4/1989 | Demarest et al. . |
| 4,873,787 | 10/1989 | Schneidmiller . |

Primary Examiner—Richard K. Seidel
Assistant Examiner—James Miner
Attorney, Agent, or Firm—Howrey & Simon

[57] ABSTRACT

The insect trap apparatus of the invention includes two chambers into which gypsy moths and other insects are attracted. The chamber entrances are restricted by shutters and flanges to limit the insect from exiting therefrom. The insect is attracted into the device by a sex lure, an insecticide or combination thereof mounted in a disposable collection bag.

6 Claims, 2 Drawing Sheets

INSECT TRAP FOR GYPSY MOTHS AND OTHER FLYING INSECTS

BACKGROUND OF THE INVENTION

1. Field of Invention

The invention relates to an apparatus for trapping flying insects such as gypsy moths and other insects which exhibit phototropic behavior. The trap of the invention incorporates two separate connected chambers, an upper entrance chamber and a lower collection bag mounting chamber for holding a disposable translucent insect collection bag. In one embodiment, the disposable collection bag includes both a sex lure or bait for attracting the insects and an insecticide for destroying the insects in question. In other alternative embodiments, the collection bag may only include the sex lure or bait for attracting the target insects or only the insecticide for destroying them. The trap may be used as a control means to destroy the insect population or, alternatively, as detection and monitoring apparatus.

2. Description of the Prior Art

Insect traps designed for the capture of gypsy moths and similar flying insects exhibiting phototropic behavior are known. One such prior art device is a milk carton shaped apparatus with insect entry ports mounted in the sides of the device. Such a device is disclosed in U.S. Pat. No. 4,592,163 to Donnie S. Wilson. Such devices are generally opaque and the insect entry ports may be shaded. However, as such a device is generally built to be disposable, the entry passages into them are so simple that the insect, once inside the trap, is not sufficiently confused by the trap's structure to remain in the trap.

Another prior art trapping device is made, at least in part, from translucent material One such device is disclosed in U.S. Pat. No. 4,400,903 to James W. Seidenberger. The Seidenberger device is a two part device The upper member is translucent and allows light to enter the trap. The lower member is an opaque tub with several entry ports in its side The lower member includes an opaque shade for covering the entry ports which are generally upwardly oriented. The gypsy moth is lured into the Seidenberger device through a chemical moth sex attractant such as pheromone which may be suspended in the device's interior. The device's translucent portion allows light to enter the device and provides a further lure because of the moth's phototropic behavior. The light in the device's interior also restrains the insect from exiting the device Because such devices must be made of a light transmissive material such as plastic, they are expensive to manufacture.

A collapsible device for trapping gypsy moths is disclosed in U.S. Pat. No. 4,442,624 to Lloyd E. Browne. The Browne device is a cardboard structure which can be assembled by the user. The Browne device includes shaded entry ports for allowing the moth to enter the device's central chamber. This chamber contains a sex lure and an insecticide. The entry ports are shaded so that the moth will not be attracted by exterior light and desire to leave the device. The ports are partially closed by a flap which acts to restrain the moth in the chamber However, as the Browne device has only a single chamber device and is not sufficiently shaded to prevent light from entering the interior chamber, the moth, in certain elevations of the sun, may be attracted out of the trap.

The prior art has numerous deficiencies in that no method is provided for ease in disposal of the trapped insects. Additionally, the prior art does not provide a simple but yet sufficiently complex series of chambers which effectively prevent the insect from leaving the device after entry.

SUMMARY OF INVENTION

It is therefore the object of the present invention to provide an improved gypsy moth trap which does not suffer from the disadvantages of known traps.

It is a further object of this invention to provide a cost-efficient trap which is effective in attracting and catching targeted insect pests while at the same time being environmentally safe.

It is a further object of the present invention to provide a trap which is sufficiently maze-like to prevent the insect from exiting the trap once it has entered the device It is another object of the invention to provide a disposable insect collection bag member for containing the sex lure which attracts the insect and which provides easy means for disposing of the remains of trapped insects. It is another object of this to provide a long life structure made of materials which are weather resistent. The structure is intended to be easily deployed and reusable.

It is a further object of the present invention to provide a simple easily produced structure which can be assembled by the user but which also has a long useful life because of the disposable bag member.

According to the present invention, an improved insect trap is provided which includes an upper housing member having a roof with an overhang providing a soffit of sufficient length to cover and shade the side walls of the upper housing member. The side walls of the upper housing are angled away from the roof to provide excellent shading The wall members include a plurality of openings with restraining shutters to allow entry of the insect into the housing but to inhibit its departure. The interior chamber of the upper housing includes a dividing wall member to further inhibit light transmission through the chamber and to direct the insect toward a sex lure or bait positioned within the trap.

Attached to the upper housing member is a lower housing member which includes a mounting bracket and entrance port into an insect collection bag. The collection bag contains a sex lure and/or the device's insecticide. The entrance to the collection bag is surrounded by flanges which inhibit the return of the insect into the upper chamber once it has entered the bag. The collection bag is translucent so that the insect may also be attracted by the exterior light once in the lower chamber.

The entire device can be made from treated paper or plastic so that it is weather-resistant. The device is constructed in flat subunits which may be folded and hooked together to form the trap assembly As a result, the trap may be easily assembled and disassembled by the user. The disassembled trap may then be stored in seasons when it is not needed.

DETAILED DESCRIPTION OF THE INVENTION

Figure 1:
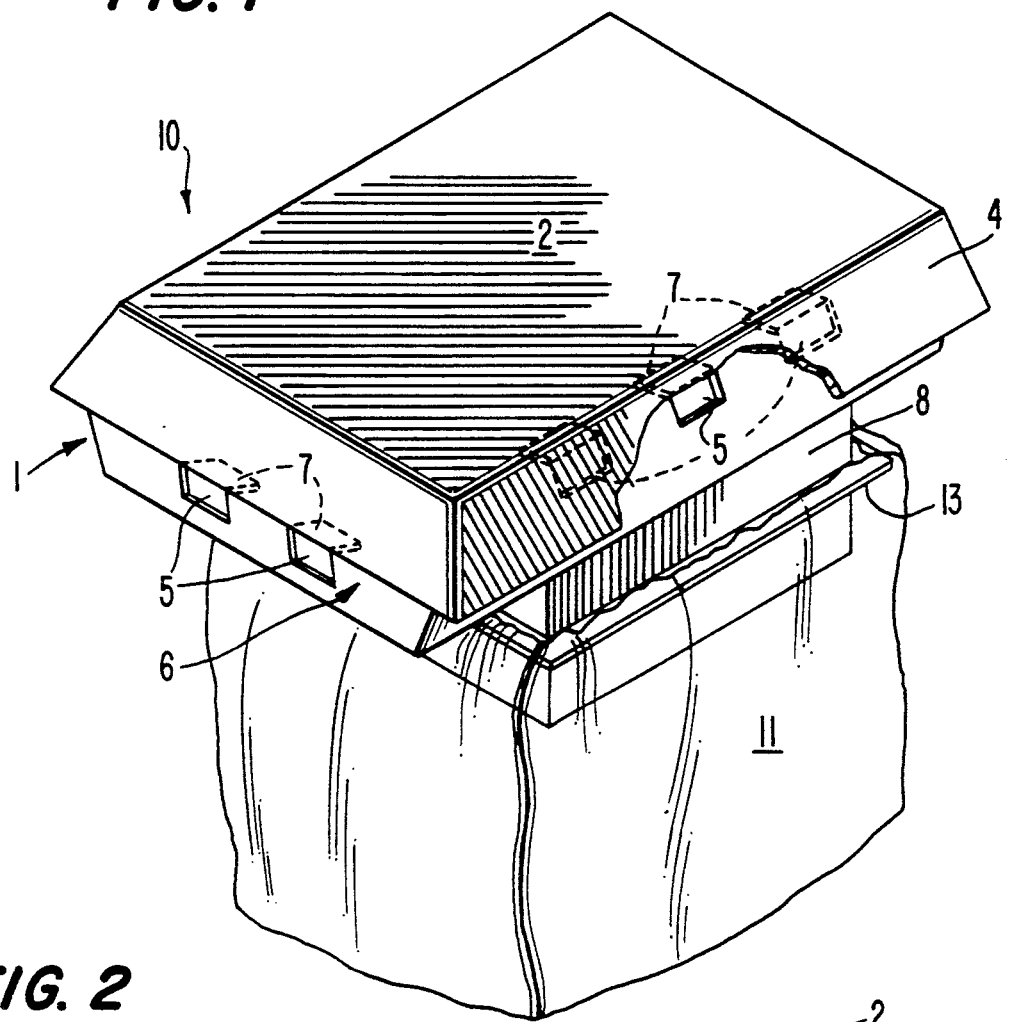
FIG. 1 is a perspective view of the insect trap of the present invention.
Figure 2:
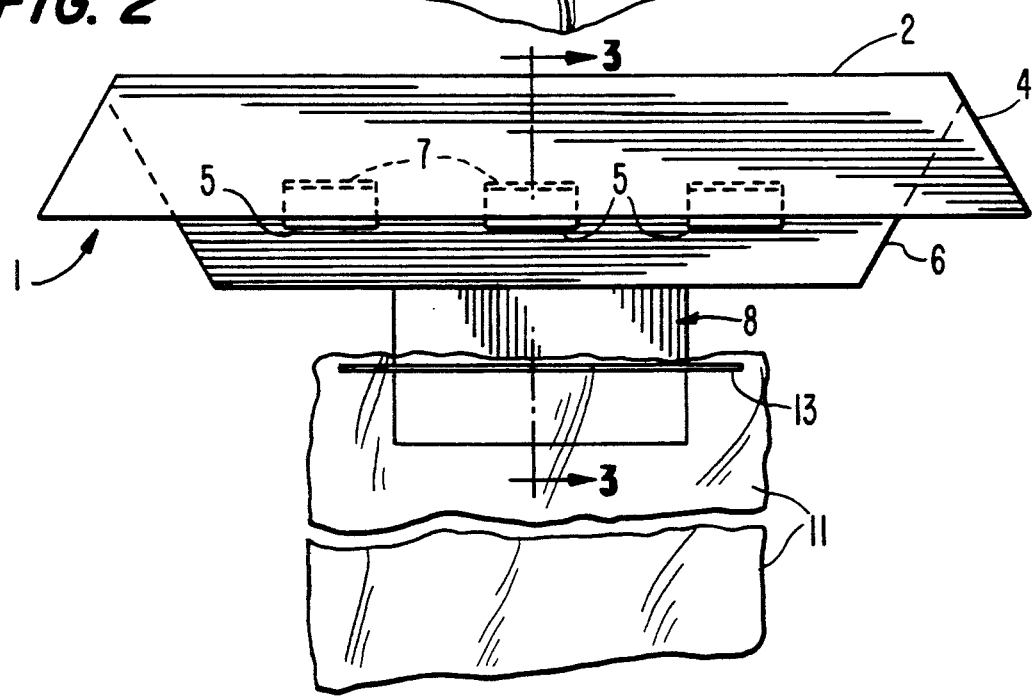
FIG. 2 is a side elevation view of the insect trap in FIG. 1.

Referring now to the drawings and, in particular FIGS. 1 and 2, the insect trap generally shown at 10 includes an upper housing member 1 including an interior insect entrance chamber 3 which is covered by a roof 2. The roof member 2 includes a long overhang 4 which provide a soffit to shade the outside of the upper housing member 1 and its insect entry ports 5. The soffit also shields the entry ports 5 from the weather and acts in conjunction with drain holes (not shown) to prevent the structure from filling with rain water. The insect entry ports 5 are positioned in the side wall members 6 of the upper housing 1. The side walls of the upper housing are angled away from the soffit overhang to provide additional shading for the entry ports 5. In order to ensure the effectiveness of the entry ports 5, the soffit acts as a continuous barrier located above each entry port 5 and around the entire trap 10. The soffit barrier arrests the insect's upward movement and directs the insect, once landed on the trap, to concentrate its searching toward the various entry ports 5. The entry ports 5 are designed and sized to permit easy entry by the insect A shutter member 7 is positioned in each entry port 5 acts to limit an insect's ability, once it has entered the upper chamber, to exit therefrom. The upper chamber 3 also includes a vertical interior wall member 17 which also inhibits the insect's exit from the upper chamber 3 and directs the insect toward a sex lure or bait which is positioned in a collection bag mounted below the upper chamber.

Figure 3:
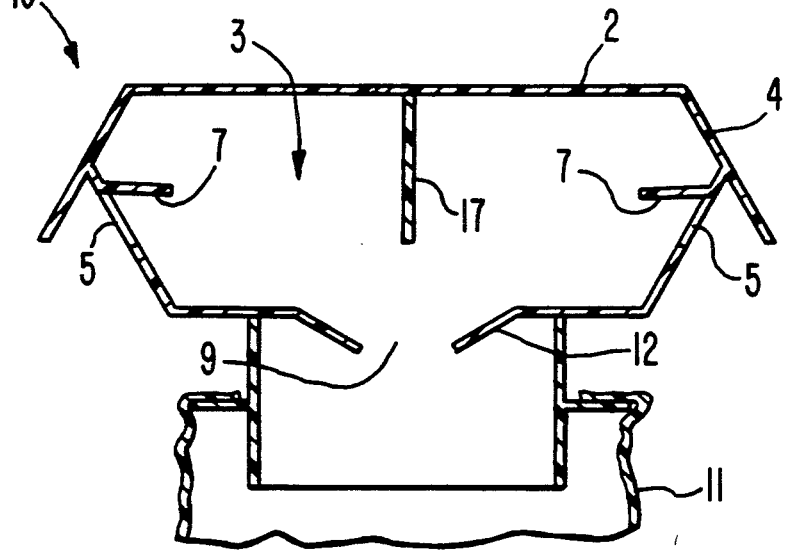
FIG. 3 is a cross-sectional view taken along line 3—3 of FIG. 2.
Figure 4:
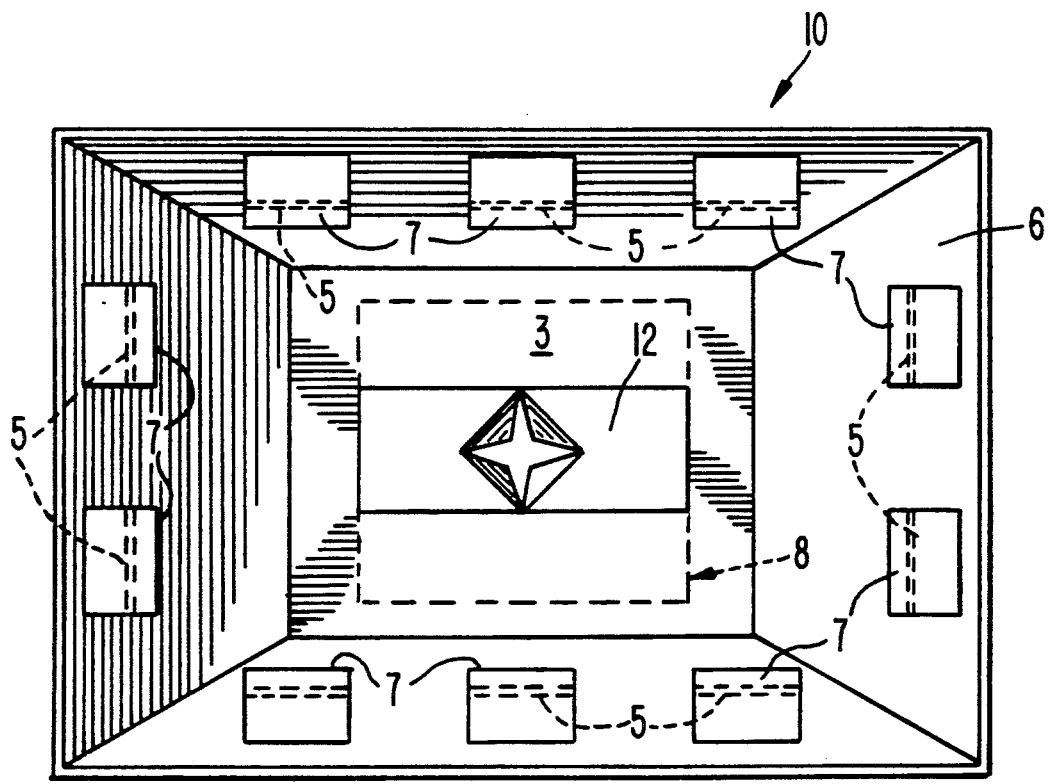
FIG. 4 is a top plan view of the upper housing of the invention with the roof removed showing entrance from the upper housing to the lower housing.

Positioned below the upper housing is a lower housing member 8 including an entrance opening 9 (see FIGS. 3 and 4) into an insect collection bag 11. Referring to FIGS. 3 and 4, the entrance opening 9 includes shutter members in the form of flanges 12 which act to inhibit the insect from returning to the upper chamber 3 once it has entered the collection bag 11.

Attached to the lower housing is a mounting bracket 13 which mounts disposable collection bag 11 adjacent an opening at the lower end of the lower housing. The collection bag 11 which is translucent may contain either a sex lure and insecticide or both. Alternatively, any other bait which would attract the insect in question may be used in place of the sex lure. The sex lure or other bait attracts the insect to the collection bag where the insecticide operates on the trapped insect. Preferably, the sex lure or bait should be placed closer to one side of the bag than the other and about 1-2 inches above the bottom of the bag. The exact height of bait placement depends on the type of bait used.

In operation, the insect lands on the outside of the upper chamber and then "wing fans" or walks towards an entry port. The insect then enters the device's upper chamber through an upper entry port 5 because of its attraction to the sex lure or other bait. The insect follows the sex lure or bait into the disposable collection bag 11 mounted below the lower chamber. The insect is also attracted by the light which is transmitted through the collection bag 11. Because of the orientation of the shutters and flanges on the various entrance ports, the insect is inhibited from returning to the upper chamber.

In particular, once in the lower chamber, to return to the upper chamber, the insect must "wing fan." The flanges 12 are positioned to block the insect with its wings extended. Further, the insect does not desire to return to the upper chamber because it is lured to remain in the collection bag by the bait contained therein and because the upper chamber is darkened by the shading members described above. In the collection bag, the insect may be destroyed by the insecticide. Alternatively, once trapped inside the collection bag, the insect may exert a great amount of energy striving and failing to escape. Needing rest, the insect ceases its efforts to escape out of the collection bag, rests and suffocates. This technique allows insect destruction without the use of possibly dangerous insecticides. The collection bag is preferably a clear plastic. Therefore, the number of insects trapped inside can be noted and, if desired, recorded by the user. When full, the collection bag 11 may be removed and disposed of. A new bag including fresh sex lure, bait and/or insecticide may then be installed.

The trap may be used as an insect control device. With appropriate placement, seasonal timing, and adequate number, the trap of this invention can reduce insect presence and damage in ornamentals and lawns, private gardens, greenhouses, nurseries, orchards, row crops, forestry, stored products (grains, nuts, etc.). Use of the trap can also help to reduce or eliminate the need for pesticides.

Alternatively, the trap may be used for detection and monitoring purposes by incorporating controlled release pheromones, lures or other attractants. Dependent upon the species specific lure placed inside the trap, the trap can be utilized in a variety of local, state, federal and private cooperative pest management programs, either in urban or suburban residential settings or in parklands or agricultural areas. As a monitoring device, the trap can provide a forewarning to scientists, extension agents, park rangers, homeowners, gardeners, nurserymen and farmers. The trap can be used to detect and monitor:

1. Growth in pest populations.
2. The movement of destructive pests into heretofore uninfested or unaffected areas or regions, or
3. Any immediate difficulties or potential future outbreaks or destruction caused by the subject insects.

The trap of the invention may be used in current detection and monitoring efforts against a diversity of insect species. Some such species may include:

1. Gypsy Moth (*Lymantria dispar* L.)
2. Spruce budworm moth (*Choristoneura fumiferna*-Clemens.)
3. Mountain pine beetle (*Dendroctonus ponderosae*-Hopkins.)
4. Southern pine beetle (*Dendroctonus frontails*-Zimm.)
5. Douglas-fir tussock moth (*Orgyia pseudotsugata* (McD.)
6. Western spruce budworm (*Choristoneura occidentalis*-Freeman.)

Additional species which the trap of this invention can detect and/or monitor include:

1. Indian meal moth.
2. Mediterranean moth.
3. Oriental fruit moth.
4. Almond and Raisan moth.

Although the invention has been described in detail with reference to specific embodiments thereof, it will be understood that variations can be made without the parting from the scope of the invention as described above and as claimed below.

What is claimed is:

1. An insect trap comprising:
   (a) an upper housing member having a shade means covering entrance ports in side walls of said upper housing member; said entrance ports being closed at least in part by a shutter means; said side walls being oriented to be substantially shaded by said shade means; and
   (b) a lower housing member mounted below said upper housing member; said lower housing member having a first opening to said upper housing member; said lower housing member having a mounting bracket at a lower end thereof, a disposable bag member mounted on said mounting bracket; said lower housing member including a second opening into said bag member; said first opening being partially closed by shutter members mounted in spaced non-contacting opposed relationship around the periphery of said first opening; said disposable bag member including an insect lure.

2. An insect trap comprising:
   (a) an upper housing member having shade means covering entrance ports in side walls of said upper housing member; said entrance ports being closed at least in part by a shutter means; said side walls being oriented to be substantially shaded by said shade means; and
   (b) a lower housing member mounted below said upper housing member; said lower housing member having a first opening to said upper housing member; said lower housing member having a mounting bracket at a lower end thereof, a disposable bag member mounted on said mounting bracket said lower housing member including a second opening into said bag member; said first opening being partially closed by shutter members mounted in spaced non-contacting opposed relationship around the periphery of said first opening; said disposable bag member including an insecticide.

3. An insect trap as claimed in either claim 1 or 2 wherein the disposable bag member is made of translucent.

4. An insect trap as claimed in either claim 1 or 2 wherein the upper housing member includes a vertical interior wall member for inhibiting the insect from exiting said upper housing.

5. An insect trap as claimed in claim 1 wherein the lure is positioned at or near the bottom of the disposable bag member and on one side of said disposable bag member.

6. An insect trap as claimed in either claim 1 or 2 wherein the shutter members at the first opening to said upper housing member are oriented to inhibit an insect in said lower housing member from exiting therefrom.

* * * * *